US006964318B2

(12) United States Patent
Sugiura et al.

(10) Patent No.: US 6,964,318 B2

(45) **Date of Patent: *Nov. 15, 2005**

(54) PORTABLE INFORMATION TERMINAL DEVICE

(75) Inventors: Atsuko Sugiura, Tokyo (JP); Naoya Ishii, Tokyo (JP); Makoto Nemoto, Tokyo (JP)

(73) Assignee: NEC Corporation, Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 10/817,912

(22) Filed: Apr. 6, 2004

(65) Prior Publication Data

US 2004/0190742 A1 Sep. 30, 2004

Related U.S. Application Data

(63) Continuation of application No. 10/201,740, filed on Jul. 24, 2002.

(30) Foreign Application Priority Data

Aug. 3, 2001 (JP) ............................ 2001-236727

(51) Int. Cl.[7] ................................................ A47B 8/06

(52) U.S. Cl. ...................... 181/199; 181/200; 181/198

(58) Field of Search ................................ 181/199, 200, 181/198

(56) References Cited

U.S. PATENT DOCUMENTS

| | | |
|---|---|---|
| 5,469,505 A | 11/1995 | Gattey et al. |
| 5,576,930 A | 11/1996 | Kuo et al. |
| 5,761,322 A | 6/1998 | Illingworth et al. |

FOREIGN PATENT DOCUMENTS

| | | |
|---|---|---|
| EP | 0 838 747 A1 | 4/1998 |
| JP | 58-52605 | 4/1983 |
| JP | 60-66185 | 5/1985 |
| JP | 10-243488 | 9/1998 |
| JP | 2000-284712 | 10/2000 |
| TW | 325954 | 1/1998 |

*Primary Examiner*—Shih-Yung Hsieh

(74) *Attorney, Agent, or Firm*—McGinn IP Law Group, PLLC

(57) ABSTRACT

A portable information terminal device has a plurality of casings providing a front surface and a rear surface, respectively. The casings have walls defining spaces in which speakers are housed and thicker than walls thereof that define a space in which a component including an internal circuit is housed. The walls defining the spaces in which speakers are housed are prevented from causing resonance due to vibrations of the speakers. The walls that define the space in which the component including the internal circuit is housed may be of a minimum thickness required irrespective of resonance caused by vibrations of the speakers. With the above arrangement, the portable information terminal device is small in size and weight.

38 Claims, 3 Drawing Sheets

PORTABLE INFORMATION TERMINAL DEVICE

The present Application is a Continuation Application of U.S. patent application Ser. No. 10/201,740 filed on Jul. 24, 2002.

BACKGROUND OF THE INVENTION

1. Field of the Invention

The present invention relates to a portable information terminal device, and more particularly to a portable information terminal device with a built-in speaker for outputting audio information such as of music or the like.

2. Description of the Related Art

Attempts have been made in recent years to improve the performance, and also to reduce the size, of information processing devices such as personal computers or the like. There have been devised portable information terminal devices based on such attempts.

Some information processing devices such as personal computers or the like incorporate a built-in speaker for outputting audio information such as of music or the like, so that the information processing devices can output the audio information via the speaker.

In the information processing devices which can output the audio information via the speaker, the audio information is recorded in a built-in hard disk and output via the speaker, or a CD is inserted into a built-in CD player and the audio information recorded on the CD is output via the speaker. Alternatively, the audio information is distributed from a public network such as the Internet to the information processing device and output via the speaker, or the audio information is received from a radio station by the information processing device and output via the speaker.

If a portable information terminal device should incorporate a built-in speaker for outputting audio information, then it is necessary that the portable information terminal device be designed to meet the following requirements:

(1) In combining the speaker with a component of the portable information terminal device, the speaker needs to be mounted in the portable information terminal device at a position effective for its use and in a manner to keep the portable information terminal device portable.

(2) The portable information terminal device needs to be constructed for protection against resonance due to vibrations of the speaker and also in view of vibrations and shocks which the portable information terminal device suffer when carried by the user.

(3) It is necessary to reduce the entire size of the portable information terminal device to keep the portable information terminal device portable, and to increase the volume of a space where the speaker is placed in order to prevent a reduction in the quality of audio information such as of music or the like that is output via the speaker.

(4) The space where the speaker is placed needs to be hermetically sealed because if sound and air leaked out of that space, then the bass part of the audio information would not be reproduced well and noise would be produced by the leakage of air.

SUMMARY OF THE INVENTION

It is therefore an object of the present invention to provide a portable information terminal device which is kept highly portable and is constructed to prevent a reduction in the quality of audio information such as of music or the like that is output via a built-in speaker.

According to the present invention, a portable information terminal device has a plurality of casings providing a front surface and a rear surface, respectively. The casings have a wall defining a space in which the speaker is disposed and thicker than a wall thereof defining a space in which the component is housed. The wall defining the space in which the speaker is housed is prevented from causing resonance due to vibrations of the speaker, thereby suppressing a reduction in the quality of audio information output via the speaker. The wall that defines the space in which the component including the internal circuit is housed may be of a minimum thickness required irrespective of resonance caused by vibrations of the speakers. With the above arrangement, the portable information terminal device is small in size and weight while at the same time preventing resonance due to vibrations of the speaker.

The casing which provides the rear surface has an outwardly convex portion in the space in which the speaker is housed. The outwardly convex portion increases the volume of the space in which the speaker is housed, while the portable information terminal device is small in size.

The convex portion reduces a planar area of the region of the casings that defines the space in which the speaker is housed, thus suppressing resonance due to vibrations of the speaker.

The portable information terminal device further has a strip-shaped shock absorbing member mounted on at least a portion where the space in which the speaker is housed is defined and a portion which serves as a contact surface when the portable information terminal device is used, of interfitting edges of the casings. The shock absorbing member is able to absorb vibrations and shocks that are applied from external objects on a desktop or the like when the portable information terminal device is erected and used on the desktop or the like or when the portable information terminal device is carried. The shock absorbing member hermetically seals the space in which the speaker is housed, for thereby preventing sound and air from leaking out of the space in which the speaker is housed.

If the casings have walls defining the space in which the speaker is housed and fastened to each other by screws, then the fastening, with the screws, of the walls that define the space where the speaker is housed increases the hermetic sealing of the space where the speaker is housed. The walls that define the space in which the speaker is housed are thicker than other walls of the casings, and hence are highly rigid, allowing the casings to be fastened to each other by the screws located at few positions.

The above and other objects, features, and advantages of the present invention will become apparent from the following description with reference to the accompanying drawings which illustrate an example of the present invention.

BRIEF DESCRIPTION OF THE DRAWINGS

FIG. 1$b$ is a rear elevational view of the portable information terminal device;

FIG. 1$c$ is a front elevational view of the portable information terminal device with a control panel shown in FIG. 1$a$ being open;

DETAILED DESCRIPTION OF THE PREFERRED EMBODIMENT

Figure 1A:
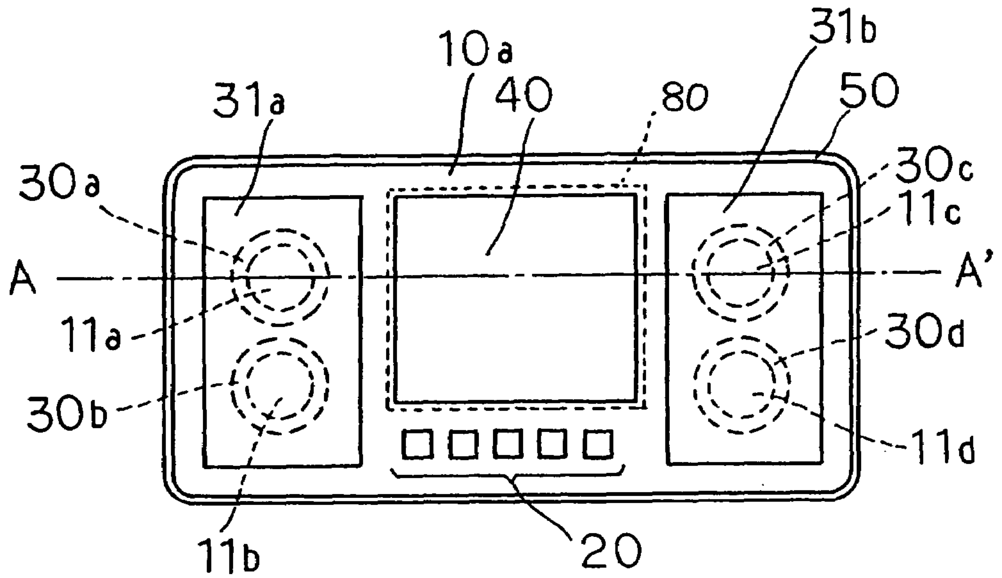
FIG. 1$a$ is a front elevational view of a portable information terminal device according to the present invention.
Figure 1B:
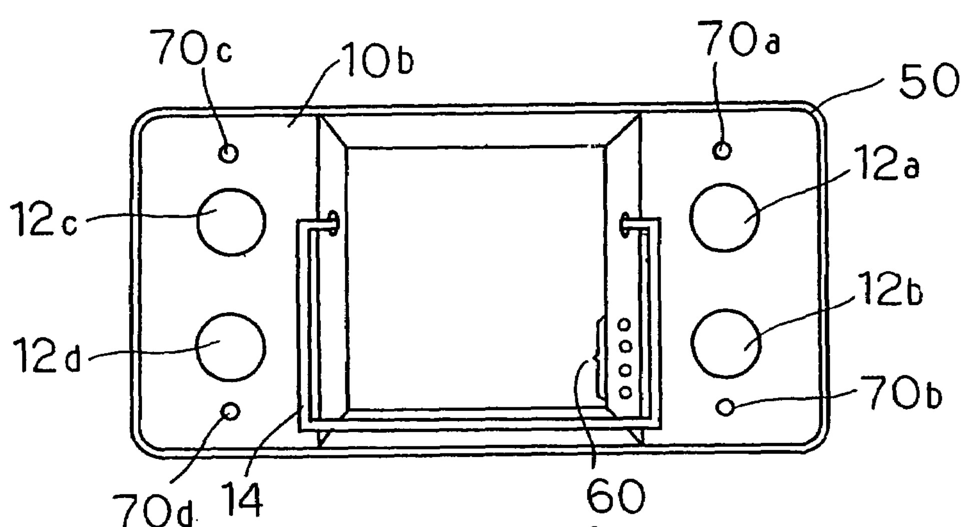
Figure 1C:
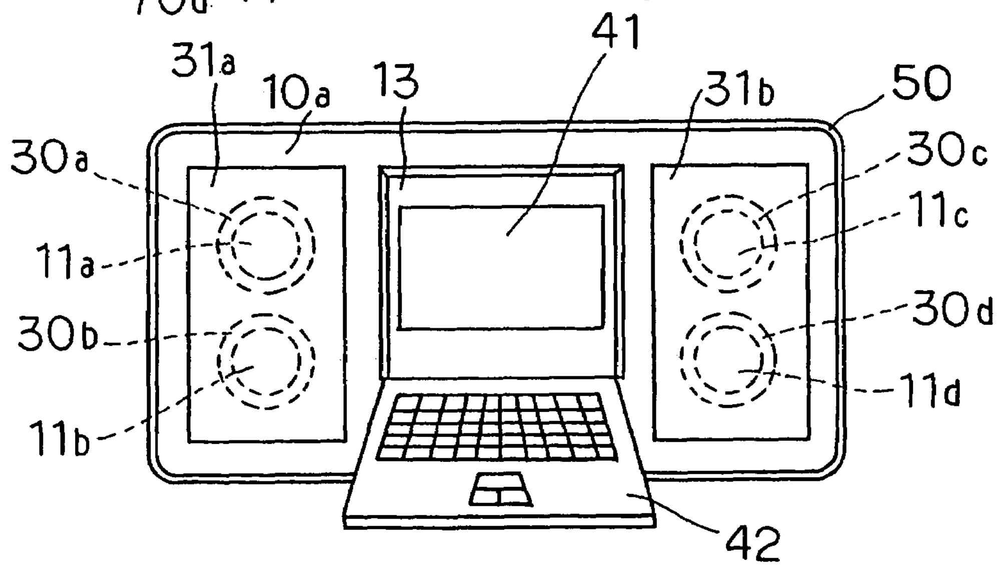

As shown in FIGS. 1*a* through 1*c*, a portable information terminal device including an internal circuit according to the present invention has component 80 and speakers 30*a* through 30*d* which are disposed in a space defined by casing 10*a* providing a front surface of the portable information terminal device and casing 30*b* providing a rear surface of the portable information terminal device, casings 10*a*, 10*b* fitting with each other. Casings 10*a*, 10*b* are fastened to each other by four screws 70*a* through 70*d* which are inserted from casing 10*b* in the spaces where speakers 30*a* through 30*d* are located. Protector 50 in the form of a rubber strip as a shock absorbing member is interposed between the interfitting edges of casings 10*a*, 10*b* in surrounding relation to the periphery of the portable information terminal device.

Casing 10*a* which provides the front surface of the portable information terminal device supports thereon switch assembly 20 and control panel 40 for selecting functions of the portable information terminal device and selecting and manipulating audio information that is output via speakers 30*a* through 30*d*. Control panel 40 is housed in storage region 13 that is defined in the front surface of the portable information terminal device by casing 10*a*. Control panel 40 comprises keyboard 42 for entering information to perform a given information processing process in the same manner as with general personal computers and editing audio information that is output via speakers 30*a* through 30*d*, and display panel 41 bonded or screwed to or fitted in casing 10*a* so as to confront keyboard 42 as it is stored in storage region 13. Display panel 41 serves as a display means for displaying information. The given information processing process that is performed using keyboard 42 includes editing documents and inputting and manipulating information at the time the Internet and e-mail are used.

Casing 10*a* has holes 11*a* through 11*d* defined therein through which there are exposed vibrating surfaces as audio output areas of speakers 30*a* through 30*d*. Speakers 30*a* through 30*d* are fixed to casing 10*a* by an adhesive or screws (not shown) such that the vibrating surfaces as audio output areas are exposed through respective holes 11*a* through 11*d*. The vibrating surfaces of speakers 30*a* through 30*d* that are exposed through respective holes 11*a* through 11*d* are covered with speaker nets 31*a*, 31*b*.

Casing 10*b* which provides the-rear surface of the portable information terminal device has convex portions 12*a* through 12*d* disposed respectively in the regions where speakers 30*a* through 30*d* are located, convex portions 12*a* through 12*d* being convex outwardly. Casing 10*b* supports thereon terminal group 60 for exchanging signals with another device (not shown) and stand 14 which can be fixed at a certain angle with respect to casing 10*b*. When stand 14*a* is fixed at the certain angle with respect to casing 10*b*, it functions as a handle for carrying the portable information terminal device and also as a stand for erecting the portable information terminal device for use on a desktop or the like.

Component 80 of the portable information terminal device including the internal circuit disposed in the space defined by casings 10*a*, 10*b* that fit with each other includes a power supply circuit, a storage circuit such as a memory, a communication circuit for performing communications via a public network, and a display control circuit for controlling the display of information on display panel 41.

A process of using the portable information terminal device thus constructed will be described below.

For carrying the portable information terminal device shown in FIGS. 1*a* through 1*c*, stand 14 is fixed at an angle in parallel to casings 10*a*, 10*b*, and the portable information terminal device is carried by handing stand 14.

Figure 2A:
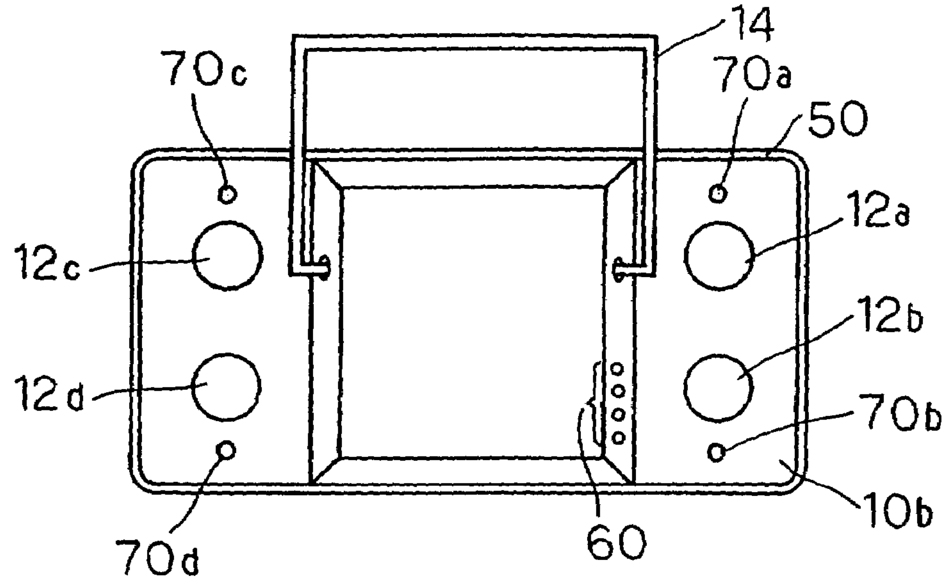
FIG. 2*a* is a rear elevational view of the portable information terminal device shown in FIGS. 1*a* through 1*c* which is prepared for being carried by the user.
Figure 2B:
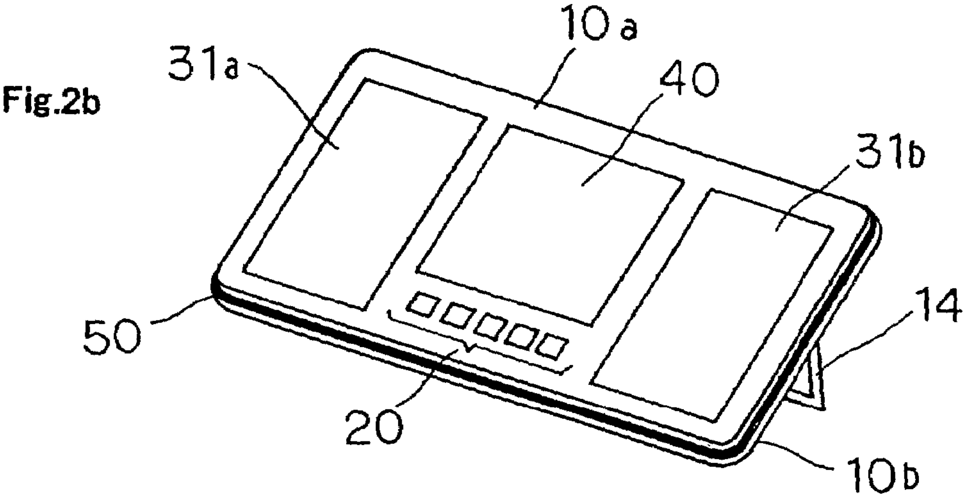
FIG. 2*b* is a perspective view of the portable information terminal device shown in FIGS. 1*a* through 1*c* which is prepared for use on a desktop.

For using the portable information terminal device erected on a desktop or the like, stand 14 is fixed at an angle for erecting the portable information terminal device on a desktop or the like, and the portable information terminal device is placed on a desktop or the like so as to lean on stand 14, as shown in FIG. 2*b*. With the portable information terminal device thus placed on a desktop or the like, audio information such as of music recorded on a built-in hard disk (not shown) may be output via speakers 30*a* through 30*d*, or a CD may be inserted into a built-in CD player (not shown) and the audio information recorded on the CD is output via speakers 30*a* through 30*d*, or audio information distributed from a public network such as the Internet to the portable information terminal device may be output via speakers 30*a* through 30*d*, or audio information may received from a radio station and output via speakers 30*a* through 30*d*.

Figure 2C:
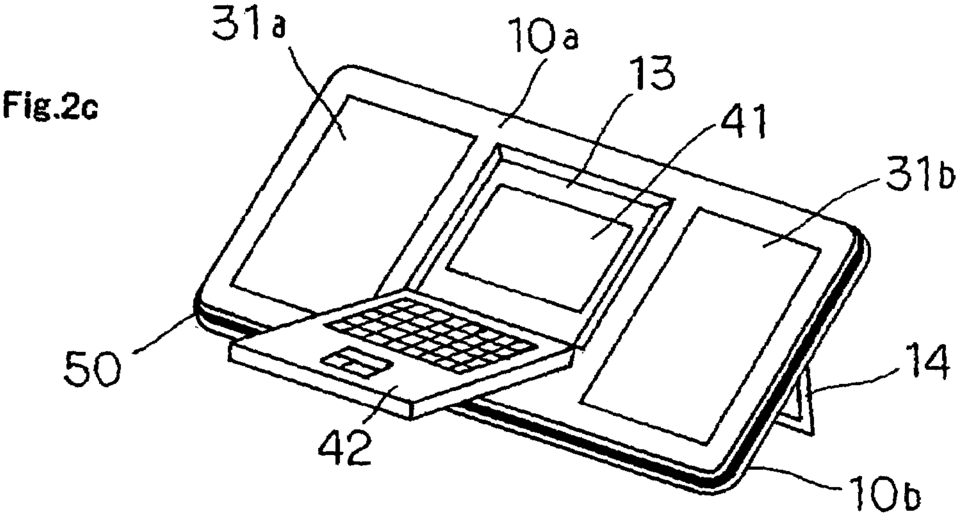
FIG. 2*c* is a perspective view of the portable information terminal device shown in FIGS. 1*a* through 1*c* which is prepared for use on a desktop and entering information through a keyboard.

For entering information via keyboard 42 of the portable information terminal device erected on a desktop or the like, stand 14 is fixed at an angle to erect the portable information terminal device on the desktop or the like, the portable information terminal device is erected on the desktop or the like so as to lean on stand 14, and keyboard 42 is taken out of storage region 13, as shown in FIG. 2*c*. With the portable information terminal device thus prepared, the user can use keyboard 42 to edit documents, use the Internet or e-mail, or edit music information or the like to be recorded in the built-in hard disk.

The spaces in which speakers 30*a* through 30*d* of the portable information terminal device are housed will be described in detail below.

Figure 3:
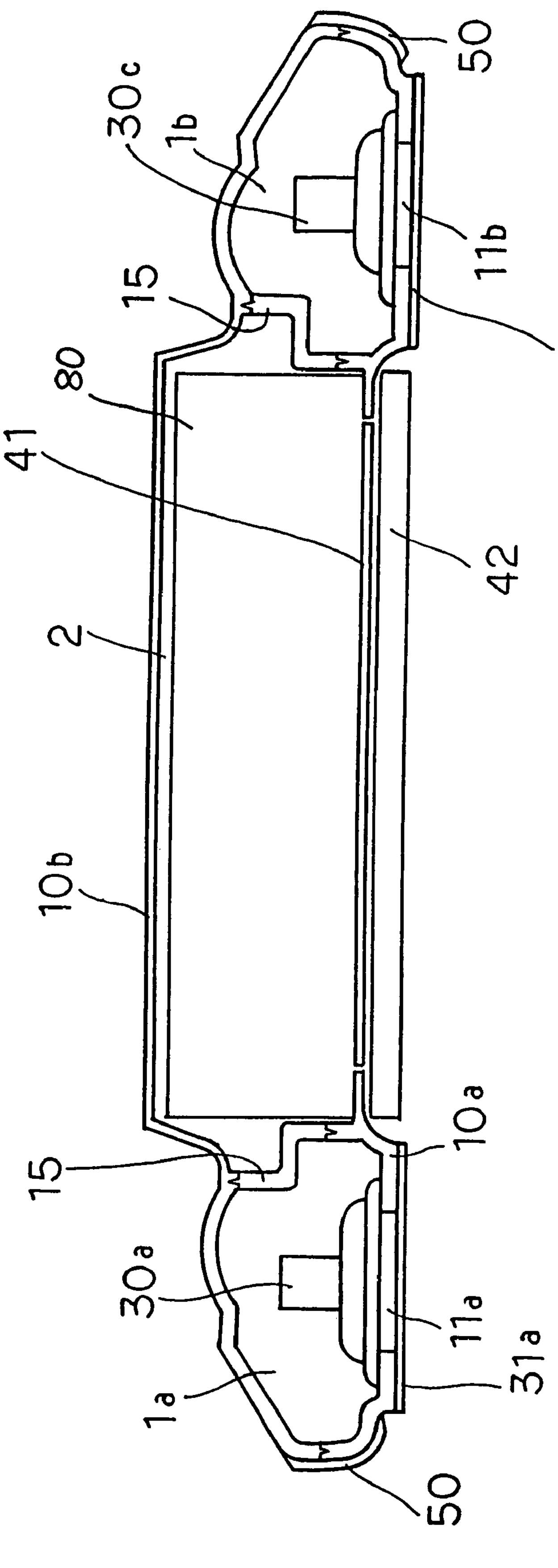
FIG. 3 is a cross-sectional view showing spaces for placing speakers in the portable information terminal device shown in FIGS. 1*a* through 1*c*.

As shown in FIG. 3, the space defined by casings 10*a*, 10*b* that fit with each other is divided by partition walls 15 into space 1*a* in which speakers 30*a*, 30*b* are housed, space 1*b* in which speakers 30*c*, 30*d* are housed, and space 2 in which the component 30 of the portable information terminal device including the internal circuit is housed. Spaces 1*a*, 1*b* in casings 10*a*, 10*b* in which speakers 30*a* through 30*d* are housed are defined by walls thicker than walls that define space 2 in which the component 30 of the portable information terminal device including the internal circuit is housed.

Partition walls 15 are of the same thickness as the walls that define spaces 1*a*, 1*b* in casings 10*a*, 10*b* in which speakers 30*a* through 30*d* are housed. Therefore, spaces 1*a*, 1*b* in which speakers 30*a* through 30*d* are housed are defined by members thicker than members that define space 2 in which the component 30 of the portable information terminal device including the internal circuit is housed.

The portable information terminal device is required to be small in size and weight as it needs to be kept portable.

Therefore, casings 10*a*, 10*b* and partition walls 15 should preferably be as thin as possible. However, if the walls of casings 10*a*, 10*b* and partition walls 15 which define the spaces in which speakers 30*a* through 30*d* are housed are thin, then those walls tend to cause resonance due to vibrations of speakers 30*a* through 30*d*.

In the illustrated embodiment, the walls of casings 10*a*, 10*b* and partition walls 15 that define the spaces in which speakers 30*a* through 30*d* are housed are thicker than the walls of casings 10*a*, 10*b* that define the space in which the component 30 of the portable information terminal device including the internal circuit is housed, thus keeping the portable information terminal device portable and preventing resonance due to vibrations of speakers 30*a* through 30*d*. The thickness of the walls of casings 10*a*, 10*b* that define the spaces in which speakers 30*a* through 30*d* are housed and the thickness of partition walls 15 may not be the same as each other insofar as they are large enough to prevent resonance due to vibrations of speakers 30*a* through 30*d*. However, if those thicknesses are of the same value as each other, which is a minimum value required to prevent resonance due to vibrations of speakers 30*a* through 30*d*, then the weight of the portable information terminal device may be minimized.

Casings 10*a*, 10*b* are fastened to each other by four screws 70*a* through 70*d* in the spaces where speakers 30*a* through 30*d* are located. Since the thickness of the walls of casings 10*a*, 10*b* and partition walls 15 that define the spaces in which speakers 30*a* through 30*d* are housed is greater than the thickness of the walls of casings 10*a*, 10*b* that define the space in which the component 30 of the portable information terminal device including the internal circuit is housed, the former walls are highly rigid, allowing casings 10*a*, 10*b* to be fastened to each other by the screws located at few positions. The fastening, with screws 70*a* through 70*d*, of the walls that define the spaces where speakers 30*a* through 30*d* are housed increases the hermetic sealing of spaces 1*a*, 1*b* in which speakers 30*a* through 30*d* are housed.

Partition walls 15 may be made of the same material as the material that makes up casings 10*a*, 10*b*. However, partition walls 15 may be made of a material different from the material that makes up casings 10*a*, 10*b* insofar as partition walls 15 divide the space defined by casings 10*a*, 10*b* that fit with each other into space 1*a* in which speakers 30*a*, 30*b* are housed, space 1*b* in which speakers 30*c*, 30*d* are housed, and space 2 in which the component 30 of the portable information terminal device including the internal circuit is housed, and partition walls 15 have a thickness large enough to prevent resonance due to vibrations of speakers 30*a* through 30*d*.

Because the portable information terminal device is required to be small in size, the volume of spaces 1*a*, 1*b* in which speakers 30*a* through 30*d* are housed should preferably be as small as possible. However, as the volume of spaces 1*a*, 1*b* in which speakers 30*a* through 30*d* are housed is reduced, the volume of speakers 30*a* through 30*d* housed in spaces 1*a*, 1*b* is also reduced, tending to reduce the quality of audio information output from speakers 30*a* through 30*d*.

In the present embodiment, therefore, casing 10*b* has outwardly convex portions 12*a* through 12*d* disposed respectively in the regions where speakers 30*a* through 30*d* are located, thus increasing the volume of spaces 1*a*, 1*b* in which speakers 30*a* through 30*d* are housed while at the same time the size of the portable information terminal device is reduced. Because convex portions 12*a* through 12*d* are disposed in alignment with respective speakers 30*a* through 30*d*, the arrangement of speakers 30*a* through 30*d* can be recognized from the appearance of the portable information terminal device, e.g., a four-way speaker system can be recognized in the present embodiment.

Convex portions 12*a* through 12*d* reduce planar areas of the regions of casings 10*a*, 10*b* that define spaces 1*a*, 1*b* in which speakers 30*a* through 30*d* are housed. Because the reduced planar areas are effective to suppress resonance, convex portions 12*a* through 12*d* suppress resonance due to vibrations of speakers 30*a* through 30*d*.

Protector 50 in the form of a rubber strip as a shock absorbing member is interposed between the interfitting edges of casings 10*a*, 10*b* in surrounding relation to the periphery of the portable information terminal device. Since protector 50 is disposed in a region where casings 10*a*, 10*b* fit with each other, i.e., a region surrounding the periphery of the portable information terminal device between the front and rear surfaces of the portable information terminal device, it is most liable to contact external objects when the portable information terminal device is carried with stand 14 held by hand or when the portable information terminal device is erected on a desktop or the like by stand 14. Therefore, protector 50 interposed between the interfitting edges of casings 10*a*, 10*b* is able to absorb vibrations and shocks that are applied from external objects when the portable information terminal device is used on a desktop or the like or carried. Inasmuch as protector 50 is interposed between the interfitting edges of casings 10*a*, 10*b*, it is additionally effective to increase the hermetic sealing of spaces 1*a*, 1*b* in which speakers 30*a* through 30*d* are housed.

In the present embodiment, protector 50 is disposed in surrounding relation to the periphery of the portable information terminal device. However, protector 50 may be mounted only on a portion of the interfitting edges of casings 10*a*, 10*b* which provides a contact surface or a contact surface and a side surface when the portable information terminal device is erected on a desktop or the like, as shown in FIGS. 2*a* and 2*b*. Alternatively, protector 50 may be mounted only on a portion of the regions of casings 10*a*, 10*b* that define spaces 1*a*, 1*b* where casings 10*a*, 10*b* fit with each other and a portion thereof which provides a contact surface.

In the present embodiment, partition walls 15 divide the space defined by casings 10*a*, 10*b* that fit with each other into space 1*a* in which speakers 30*a*, 30*b* are housed, space 1*b* in which speakers 30*c*, 30*d* are housed, and space 2 in which the component 30 of the portable information terminal device including the internal circuit is housed. However, partition walls 15 may be dispensed with, and the space defined by casings 10*a*, 10*b* that fit with each other may be divided by casing 10*a* or casing 10*b* into space 1*a* in which speakers 30*a*, 30*b* are housed, space 1*b* in which speakers 30*c*, 30*d* are housed, and space 2 in which the component 30 of the portable information terminal device including the internal circuit is housed.

While a preferred embodiment of the present invention has been described using specific terms, such description is for illustrative purposes only, and it is to be understood that changes and variations may be made without departing from the spirit or scope of the following claims.

What is claimed is:

1. An information terminal device, comprising:

a front casing and a rear casing that are fitted together to provide a first space and a second space, which are adjoined;

a component disposed in said second space for processing information; and a speaker disposed in said first space for outputting audio information, wherein a partition wall of each of said front casing and said rear casing separates said first space from said second space, and wherein said partition wall and first walls of said front casing and said rear casing, which encase said first space, are of a same thickness and are thicker than second walls of said front casing and said rear casing.

2. An information terminal device according to claim 1, wherein said partition wall, said first walls, and said second walls comprise the same material as said front casing and said second casing.

3. An information terminal device according to claim 1, further comprising a shock absorbing member that is exteriorly mounted on a portion of at least one of said front casing and said rear casing, which encases said first space.

4. An information terminal device according to claim 3, wherein said shock absorbing member comprises rubber.

5. An information terminal device according to claim 1, wherein said front casing includes a hole to said first space through which a vibrating surface of said speaker is exposed, said speaker being connected to said front casing within said first space, and wherein said rear casing includes an outwardly convex portion corresponding to said speaker.

6. An information terminal device according to claim 1, wherein said front casing and said rear casing are fastened together by screws.

7. An information terminal device according to claim 1, further comprising a display for outputting and displaying information.

8. An information terminal device according to claim 7, further comprising a keyboard for entering information.

9. An information terminal device according to claim 8, wherein said front casing includes a storage region for storing said keyboard, and said display comprises a display panel disposed in apposition to said keyboard, when said keyboard is stored in said storage region.

10. An information terminal device according to claim 1, wherein said partition wall is thicker than second walls of said front casing and said rear casing, which encase said second space.

11. An information terminal device according to claim 1, further comprising a shock absorbing member that is exteriorly mounted on a portion of at least one of said front casing and said rear casing, and which comprises a contact surface, when said portable information terminal device is used on a work surface.

12. An information terminal device, comprising:

a front casing a rear casing that are fitted together to provide a first space and a second space, which are adjoined;

a component disposed in said second space for processing information; and a speaker disposed in said first space for outputting audio information, wherein each of said front casing and said rear casing includes a wall of greater thickness than other walls of said front casing and said rear casing, respectively, said wall of greater thickness encasing said first space.

13. An information terminal device according to claim 12, further comprising a shock absorbing member that is exteriorly mounted on a portion of at least one of said front casing and said rear casing, which encases said first space.

14. An information terminal device according to claim 13, wherein said shock absorbing member comprises rubber.

15. An information terminal device according to claim 12, wherein said front casing includes a hole to said first space through which a vibrating surface of said speaker is exposed, said speaker being connected to said front casing within said first space, and wherein said rear casing includes an outwardly convex portion corresponding to said speaker.

16. An information terminal device according to claim 12, wherein said front casing and said rear casing are fastened together by screws.

17. An information terminal device according to claim 12, further comprising a display for outputting and displaying information.

18. An information terminal device according to claim 17, further comprising a keyboard for entering information.

19. An information terminal device according to claim 18, wherein said front casing includes a storage region for storing said keyboard, and said display comprises a display panel disposed in apposition to said keyboard, when said keyboard is stored in said storage region.

20. An information terminal device according to claim 12, further comprising a shock absorbing member that is exteriorly mounted on a portion of at least one of said front casing and said rear casing, and which comprises a contact surface, when said portable information terminal device is used on a work surface.

21. A display device, comprising:

a front casing and a rear casing that are fitted together to provide a first space and a second space, which are adjoined;

a component is disposed in said second space for processing information;

a speaker is disposed in said first space for outputting audio information; and a display for outputting and displaying information, wherein a partition wall of each of said front casing and said rear casing separates said first space from said second space, and wherein said partition wall and first walls of said front casing and said rear casing, which encase said first space, are of a same thickness and are thicker than second walls of said front casing and said rear casing.

22. A display device according to claim 21, wherein said partition wall, said first walls, and said second walls comprise the same material as said front casing and said second casing.

23. A display device according to claim 21, further comprising a shock absorbing member that is exteriorly mounted on a portion of at least one of said front casing and said rear casing, which encases said first space.

24. A display device according to claim 23, wherein said shock absorbing member comprises rubber.

25. A display device according to claim 21, wherein said front casing includes a hole to said first space through which a vibrating surface of said speaker is exposed, said speaker being connected to said front casing within said first space, and wherein said rear casing includes an outwardly convex portion corresponding to said speaker.

26. A display device according to claim 21, wherein said front casing and said rear casing are fastened together by screws.

27. A display device according to claim 21, further comprising a keyboard for entering information.

28. A display device according to claim 27, wherein said front casing includes a storage region for storing said keyboard, and said display comprises a display panel disposed in apposition to said keyboard, when said keyboard is stored in said storage region.

29. A display device according to claim 21, wherein said partition wall is thicker than second walls of said front casing and said rear casing, which encase said second space.

30. A display device according to claim 21, further comprising a shock absorbing member that is exteriorly mounted on a portion of at least one of said front casing and said rear casing, and which comprises a contact surface, when said portable information terminal device is used on a work surface.

31. A display device, comprising:

a front casing and a rear casing that are fitted together to provide a first space and a second space, which are adjoined;

a component disposed in said second space for processing information;

a speaker disposed in said first space for outputting audio information; and a display for outputting and displaying information, wherein each of said front casing and said rear casing includes a wall of greater thickness than other walls of said front casing and said rear casing, respectively, said wall of greater thickness encasing said first space.

32. A display device according to claim 31, further comprising a shock absorbing member that is exteriorly mounted on a portion of at least one of said front casing and said rear casing, which encases said first space.

33. A display device according to claim 32, wherein said shock absorbing member comprises rubber.

34. A display device according to claim 31, wherein said front casing includes a hole to said first space through which a vibrating surface of said speaker is exposed, said speaker being connected to said front casing within said first space, and wherein said rear casing includes an outwardly convex portion corresponding to said speaker.

35. A display device according to claim 31, wherein said front casing and said rear casing are fastened together by screws.

36. A display device according to claim 31, further comprising a keyboard for entering information.

37. A display device according to claim 36, wherein said front casing includes a storage region for storing said keyboard, and said display comprises a display panel disposed in apposition to said keyboard, when said keyboard is stored in said storage region.

38. A display device according to claim 31, further comprising a shock absorbing member that is exteriorly mounted on a portion of at least one of said front casing and said rear casing, and which comprises a contact surface, when said portable information terminal device is used on a work surface.

* * * * *